INVENTOR
William B. Joyce
BY Cushman, Darby & Cushman
ATTORNEYS

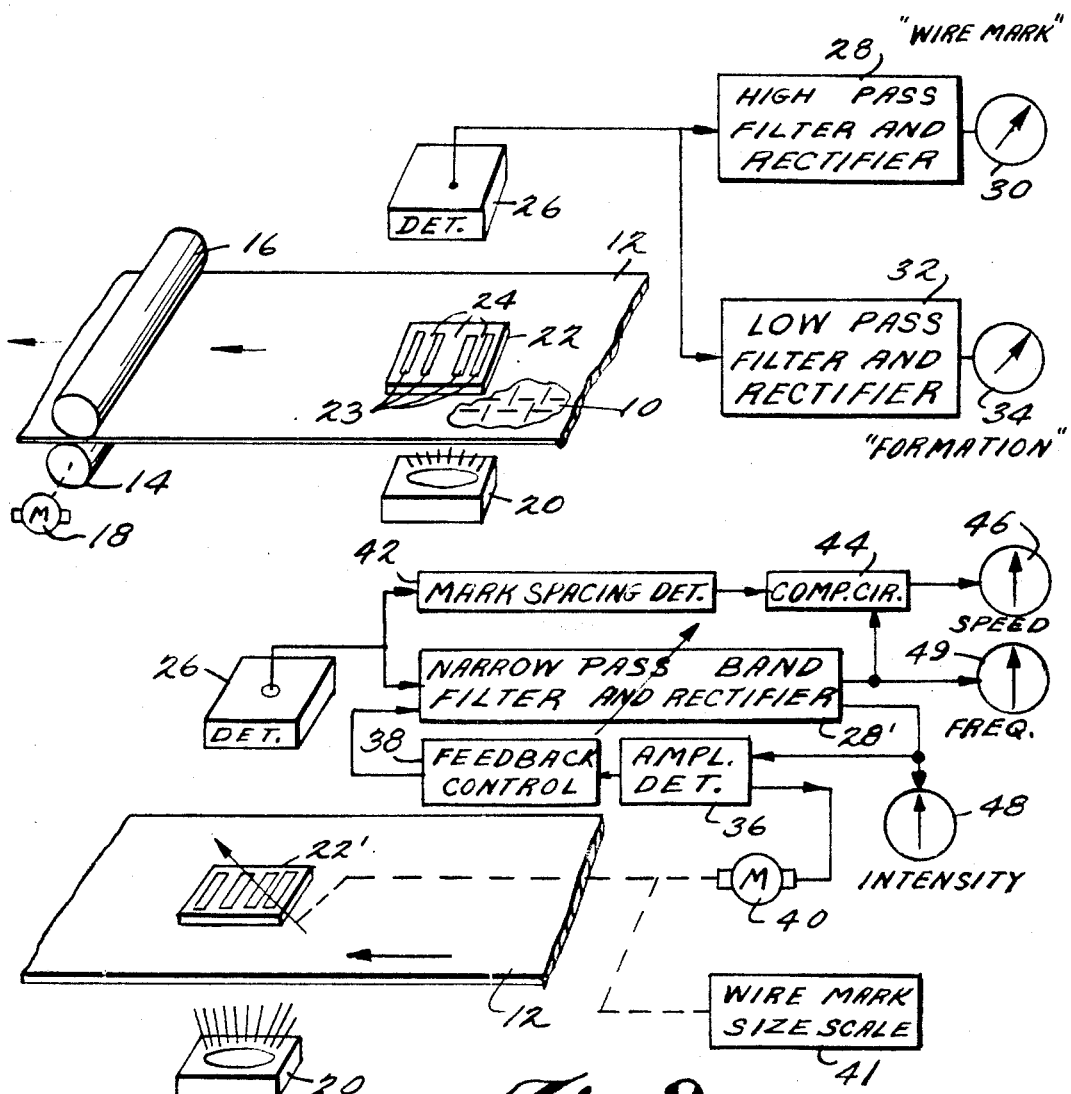

United States Patent Office 3,437,823
Patented Apr. 8, 1969

3,437,823
METHOD AND APPARATUS FOR DETECTING A GIVEN PATTERN IN A MOVING WEB SUCH AS WIRE MARK IN PAPER
William B. Joyce, Columbus, Ohio, assignor to Industrial Nucleonics Corporation, a corporation of Ohio
Filed Aug. 11, 1965, Ser. No. 478,963
Int. Cl. G01n 21/30; G01j 1/20
U.S. Cl. 250—219          32 Claims

ABSTRACT OF THE DISCLOSURE

A masking arrangement containing apertures disposed in a pattern to detect in a moving web a given pattern, to which the mask pattern corresponds at least partially, by detecting the intensity of that given pattern when energy is transmitted through the mask arrangement and web. Specifically the web is paper and the given pattern its wire mark. The masking arrangement may take any one of several forms. It generally has the same size and shape as the mark to be detected, and in one embodiment contains a plurality of parallel slots separated the same as the successive wire marks, the slots being perpendicular to the direction of paper movement. The detected output signal is passed through a filter to attenuate non-wire mark frequencies, with the filter output being metered to provide a measure of the variations or intensity of the wire mark. The intensity detector can also measure the size of the wire mark. In one embodiment, the mask arrangement is adjustable so as to regulate the dimensions of its apertures. The mask arrangement is a single piece in one embodiment but is made up of two or more relatively movable plates in other embodiments. By use of the wire mark detector, paper speed may be determined along with the size of the wire mark.

---

This invention relates to the measuring of variations in structure of a web such as sheet material. In particular, it relates to the detection of wire marks in paper.

An introduction of the problem which exists in sensing wire marks may be had by reference to the Burkharb et al. article "A Formation Detector Which Graphically Records Paper Structure," which appeared in the June 1960, issue of "Pulp and Paper of Canada" magazine.

It is the foremost object of this invention to provide an improved apparatus for sensing recurring variations in sheet material.

In the early part of paper manufacturing, the paper spends some time on a wire screen under the influence of a vacuum. This effect can be seen by holding a sheet of paper up to a light. The apparent effect is known as a wire mark.

Thus a primary purpose of this invention is a practical means of detecting the wire mark, both the presence of the mark and to what degree it is present. Any knowledge of these parameters may prove useful as an indication of quality or other parameters of the paper, the performance of the paper machine, and the operating level of the paper machine, or for purposes of controlling the operation.

In one embodiment of the invention, the detection of the wire mark is facilitated by use of a mask, which has the same size and shape as the mark to be detected.

The individual lines of a wire mark are so small that it is difficult to detect them mechanically on an individual basis. Furthermore, the wire mark may not be apparent when viewed on a scale comparable to the dimensions separating adjacent lines in the wire mark. On this scale the variations in transmitted light to the wire marks are of a statistical nature which means that a detector of this size would record a great deal of noise. The wire mark appears when the paper is viewed on a scale many times the characteristic wire mark dimensions. On this scale certain regularities are apparent in the statistical description. It is therefore another object of this invention to provide a means to improve the detection of the wire mark.

Other objects and advantages of this invention will become apparent to those of ordinary skill in this art upon reading the appended claims and the following detailed description, in which:

FIGURE 1a is a diagrammatic view of a system according to the present invention;

FIGURE 2 is a diagrammatic view of improved embodiments of this invention;

FIGURE 4a is a plan view of a further embodiment of a mask with adjustable spacing;

Figure 1B:
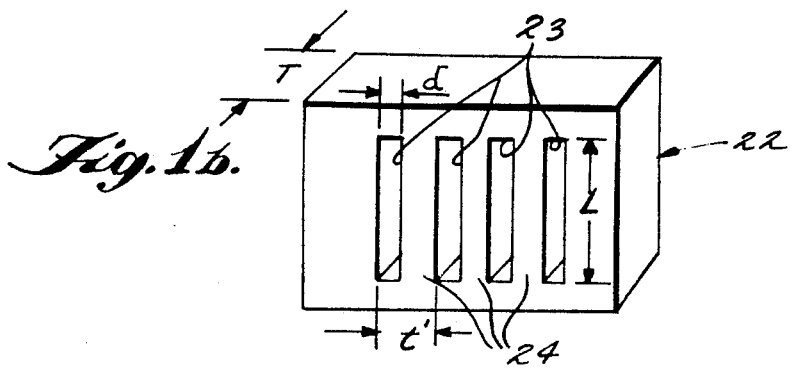
FIGURE 1b is a perspective view of a mask useable in FIGURE 1a, showing various dimensions.

In FIGURE 1a, numeral 10 represents a typical wire mark pattern located on the moving paper 12. It is to be understood that normally pattern 10 is not as readily visible to the human eye as shown, and that it generally extends the full width and length of the paper, a patch of the pattern being rendered visible in the drawing for illustrative purposes. Paper 12 may be moved longitudinally, as shown by the arrows, by any suitable arrangement of rollers or mills and is represented by rollers 14 and 16 and by motor 18. As illustrated, the typical wire mark pattern 10 includes lines extending longitudinally of the paper and crossing lines transverse thereto. The longitudinal lines are illustrated approximately parallel to the paper edges but they may not be parallel in other instances, and neither do the transverse lines of the pattern need to be perpendicular to the paper edges though approximately so usually.

A beam of radiation such as the rays from light source 20, which is located on the underneath side of paper 12, is directed perpendicular to the plane of the paper and passes through the paper and through mask 22 into an intensity sensor or detector 26. Besides the direct transmitted light shown, forward scattered light or back scattered (reflected) light may be used as well as collimated or diffuse light. The light source may be of any type, and if it is a laser, a sharp cutoff optical filter on the detector may be useful to differentiate between scattered and unscattered radiation and hence enhance the signal to noise ratio. Back scattered or reflected light is particularly useful when sheet 12 has a backing or when the variations in the sheet are in the form of ridges which cast shadows. The sensing equipment including source 20, mask 22 and detector 26 which may be located where desired, for example, either prior to or after the drying station (not shown) of the overall papermaking apparatus. Masking plate 22 is preferably made of a nontranslucent material, though some translucent materials may scatter a sufficient amount of light. In any event, the mask is slotted with parallel slots 23 having substantially the same separation as the wire mark. It should be noted that the slots are preferably approximately perpendicular to the direction in which the paper is moving if the wire mark lines are also perpendicular thereto, since it is desirable that the slots be substantially at the same angle to the paper edges as the wire mark lines being detected. While source 20 and the mask-detector arrangement are shown separated, for convenience of illustration, preferably they are as close to the paper as possible. Also, they may be the source of relative motion instead of the moving paper 12.

When the dark lines of the wire mark are under the slots 23 of the detector, a minimum of light intensity is recorded by the detector. When the spaces between the lines of the wire mark are under the mask slots, a maximum of intensity is produced. Thus an alternating output from the detector 26 is produced.

If the wire mark is very faint, transmitted light has little variation over the wire mark distances, and the A.C. signal becomes very small. Thus the amplitude of the detected signal is an index of wire mark intensity. If it is desired to correct for variations in light intensity resulting from dirt, aging, change in paper thickness or transmissivity, etc., the ratio of the rms A.C. signal to the D.C. signal may be used as the intensity index.

In order to separate the wire mark signal from other variations in transmitted light due to the variations in the paper, the signal may be filtered by a filter which attenuates frequencies other than that of the wire mark frequency. High frequency filter and rectifier equipment 28 is provided to attenuate unwanted frequencies and its output, indicated at meter 30, is a measure of the variations or intensity of the wire mark. Equipment 28 is provided with the usual rectifier for metering purposes.

In addition, a low frequency filter 32 and the usual rectifier may also be utilized to provide a measure of formation as indicated at meter 34.

A discussion of formation may be found in the pending application of Donald E. Brunton, Ser. No. 335,030, filed Jan. 2, 1964, and in the above-mentioned Burkharb et al. article.

The use of low frequency filter 32 to obtain a measure of formation becomes necessary in order to attenuate the variation in web or paper structure which is caused by the wire mark itself. In other words, to have an accurate indication of formation when viewed through the same mask simultaneously as a detector of wire mark intensity, it becomes necessary to view the paper over a rather large area. This becomes difficult due to the disposition of the portions of nontransulucent material 24 of the mask between the slots. Attenuating the wire mark frequency by use of the low frequency filter 32 eliminates electrically the presence of the nontranslucent material and the paper or web is theoretically viewed through a noninterrupted opening extending from one outer end slot to the other. This uninterrupted effective opening should be smaller, for best results, than the smallest size of formation which it is expected to detect.

Thus, the filtering of the detector output as a function of frequency gives a spectral representation of the transmissivity down to the wave length equal to the wire mark spacing, but excluding wave lengths slightly larger than that spacing. As noted above, the arrangement in FIGURE 1a detects variations in paper light transmissivity which are of any size notably larger than the wire mark such as formation and does it simultaneously with the wire mark detection.

The length and number of slots for a given application can be determined for a wire mark gauge from the following considerations. The length of each slot may not be too long because of alignment problems. Thus if the detector can be held to an alignment error of less than $\theta$ radiants, then $L < t/\theta$ (see FIGURE 1b) where L is the length of the slot and $t$ is the wire mark separation, i.e., the distance from the center of one wire mark line to the next. If the wire mark exhibits some curvature, this may also set an upper limit on length L. the width $d$ of each slot 23 should be comparable to the thickness of material 24 between the slots so the detector will transmit about one half the light falling on it. This, as much of the discussion herein, presumes wire mark separation $t$ equals slot spacing $t'$ shown in FIGURE 1b and they should be equal or $t'$ should be equal to an integral multiple of $t$. In the latter case, width $d$ remains the same as if $t$ and $t'$ were equal, and the increase in $t'$ is due to the increasing thickness of material 24 between slots. The best ratio of slot to space size depends on the particular paper used.

The number of slots used may be as few as one or as many as alignment will allow. Thus if $\Delta t/t = 0.1$ then $$N \ll \frac{1}{.1} = 10$$

where $\Delta t$ is the uncertainty in distance $t$, the wire mark separation and N is the number of slots. The total area through which light can pass is the product of $NLd$. The area must be large enough so that transmitted light is strong enough to be detected. The area of the paper covered by the detector is $NLt'$. Wire mark in this area is averaged. Thus, $NLt'$ must be smaller than the area over which it is desired to know the wire mark variations. Normally, the averaging time of the electronics associated with the detector, corresponds to averaging over a much greater area than $NLt'$. If the detector does not touch the paper (a less desirable arrangement from the detection standpoint), then thickness T should be comparable to R or even greater, where R is the distance from the mask to the paper. Where the required thickness T is large, the mask or screen may be made of two or more aligned parallel masks having small individual thicknesses but being spaced a distance sufficient to give the overall required thickness T. The slots 23 may also be separated by any integer times the distance between adjacent lines of the wire mark, and in that case, the number of slots N is reduced by a factor equal to the reciprocal of this integer.

This mask arrangement is proper for the detection of any pattern which influences the transmission of radiation. The aperture configuration, which may be multiplied in the mask a desired number of times, is a pattern with the same or similar design as the pattern to be detected. Therefore, it follows that triangles may be detected by a detector mask with (preferably, but not necessarily) triangular holes, etc.

Another important feature of this invention is to enable the wire mark intensity detector to determine the size of the wire mark as the paper moves by. As previously noted, mask 22 comprises a number of parallel slots. The average intensity of the A.C. part of the light that it transmits when properly filtered is maximum when the spacing of the slots 23 is the same as the spacing of adjacent lines in the wire mark. This effect permits certain further measurements if one utilizes a mask with variable or adjustable spacing of the parallel slots. More generically the size of the pattern of apertures is preferably adjustable.

One way of accomplishing this feature is shown in FIGURE 2 and utilizes a variable frequency, narrow pass band filter 28'. The input to filter 28' is connected to the output of detector 26, and the output of filter 28' is rectified and then fed to amplitude detector 36. Amplitude detector 36 supplies a feedback control circuit 38 which automatically varies the frequency band of filter 28', to maximize the output of filter 28'. The variable frequency filter 28' is well known and may be the type which uses in control circuit 38 a servo system to vary mechanically the capacitive or inductive reactance of the filter to vary its frequency, or circuit 38 may include a conventional variable reactance tube for the same purpose. This may also be accomplished by nulling the difference of two narrow pass filters which are slightly separated in their pass frequencies and which are mechanically or electrically ganged so that their pass frequencies may be shifted simultaneously while maintaining the difference in their frequencies. An immediate or relatively fast response is desired. Amplitude detector 36 also energizes a servo motor system 40 to adjust, with a relatively slow response, the variable spacing between the slots of mask 22' so as to cause the output of the filter 28' to be maximum. In the case of two filters determining the maximum, a third ganged or broader pass filter or one of the two filters adjusts the mask. Servo motor 40 may further operate a conventional chart or like meter 41 for visually indicating the wire mark size while meter 48 indicates the amplitude or intensity of the mark. Filter-rectifier 28' also provides an output to meter 49 which indicates the position (e.g., the pass frequency) of the filter.

Instead of using filter 28' and its feedback control circuit 38, the output of detector 26 may be fed to a circuit which removes the D.C. component of the signal whereby amplitude detector 36 feeds the A.C. signal to servo motor 40 only, to maximize slot spacing and indicate wire mark size on recorder 41. This approach, however, requires a somewhat wider pass band in the filter and does not provide for a measurement of the pass frequency.

Figure 3:
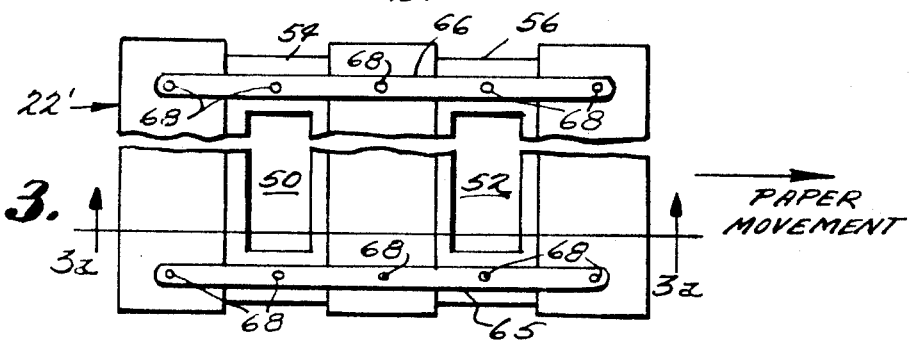
FIGURE 3 is a plan view of an adjustable mask useable in FIGURE 1b.
Figure 3A:
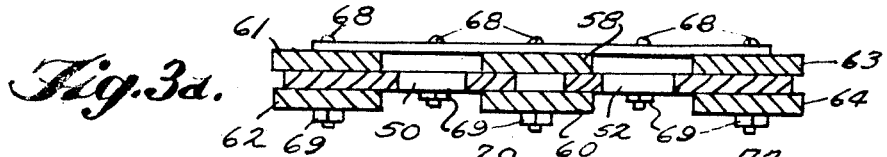
FIGURE 3a is a cross sectional view of the adjustable mask of FIGURE 3.

FIGURES 3 and 3a represent one type of adjustable mask 22' (in enlarged views) which may be used with the servo motor system 40. This adjustable mask is illustrated with just two apertures 50 and 52, but it is to be understood that more apertures may be included in this embodiment, as desired. Since it is preferred that slots 50 and 52 are about as wide as one-half of the spacing between them, the slots are shown quite wide in FIGURE 3, but it is to be understood that their thickness may be determined in a manner similar to that discussed herein. Slots 50 and 52 are disposed in respective thin, flat plates 54 and 56. These plates, in turn, are slidable between a center pair of thin plates 58 and 60, a pair of similar outer plates 61 and 62 on the left end, and 63 and 64 on the right end. These plates are held together by a pair of parallel rods 65 and 66, each of which is pivoted on each of the pairs of plates 58–64, as well as on the sliding plates 54 and 56, as by use of bolts 68 having nuts 69. When rods 65 and 66 are perpendicular to the plates as shown, slots 50 and 52 are separated their maximum amount. If plates 58 and 60, for example, are held stationary while plates 61 and 62 are moved upwards in FIGURE 3, rods 65 and 66 stay parallel. Plates 54 and 56 also stay parallel while sliding vertically in opposite directions and slightly inward. This maintains slots 50 and 52 parallel, but slightly decreases their separation distance. Further movement of plates 61 and 62 upward, would cause slots 50 and 52 to be moved still closer together. Accordingly, servo motor 40 of FIGURE 2 can be connected to cause plates 61 and 62 to move upward or downward, as viewed in FIGURE 3, while plates 58 and 60 (or plates 63 and 64 instead, if desired) are held stationary, thereby causing the slot separation distance to be adjusted to correspond to the separation of adjacent wire marks. The purpose of this rather complex embodiment is to keep the total aperture constant even though the spacing is changed. Thus, the change in signal is due to wire mark effects only rather than simply a loss of signal due to a chanigng aperture. Otherwise, it may be desirable to divide the R.M.S. A.C. signal by the D.C. level and work with the resulting ratio (as may be done anyhow for reasons previously mentioned).

Figure 4:
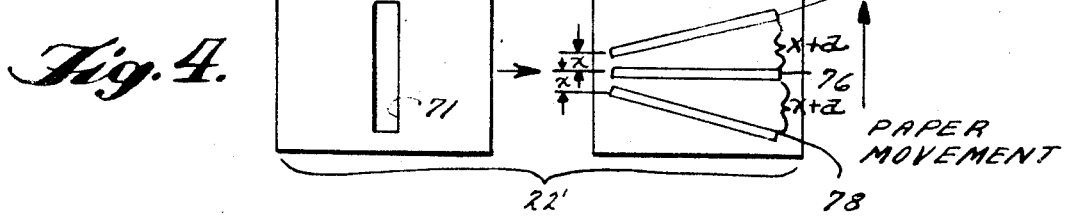
FIGURE 4 is an exploded plan view of another embodiment of a mask with adjustable spacing.

Another adjustable mask 22' shown exploded in FIGURE 4 makes use of two flat plates 70 and 72, plate 70 with a single slot 71 being movable across plate 72. Plate 72 has slots 74, 76 and 78, which continuously diverge rightwardly with respect to each other, the upper two being spaced $x$ distance apart on the lefthand side of the figure and $x+a$ distance apart on the right side. It should be pointed out that a single slot of a divergent or V-shape or only two of the illustrated slots, for example, slots 74 and 76 or slots 74 and 78, may also be used if desired. Plates 70 and 72 are adjusted in their relative overlying position by servo motor 40 of FIGURE 2 until the A.C. signal that detector 26 sees through slot 71 is a maximum when the lines of the wire mark are sensed. At this time the transmitted A.C. signal from detector 26 has a maximum peak-to-peak value since its lower value is minimum due to that portion of slots 74, 76, 78 then covered by slot 71 being simultaneously over wire mark lines, and since the upper value of the A.C. detector output is maximum because that portion of the slots in plate 72 is alternately over the spaces between the wire mark slots thereby transmitting the maximum amount of A.C. light. The relative position of plates 70 and 72 is therefore a function of the wire mark spacing and may be so calibrated in conjuction with servo motor system 40. In the case of just a single V-slot in plate 72, relative adjustment of plate 70 is preferably in response to the maximizing of the ratio of the R.M.S. A.C. signal to the D.C. signal, for greater accuracy and compensation of the change in aperture due to the relative movement of the plates.

Another mask arrangement is shown in FIGURE 4a in which the same plate 70 and its slot 71 are used, but this time in conjunction with a plurality of wires 73, these wires diverge from a common point 75 to a securing bar 77. Plate 70 is movable in the direction of arrows 79 so that slot 71 is traversed by the larger or smaller spacings between adjacent wires 73 according to the wire mark size.

Figure 5:
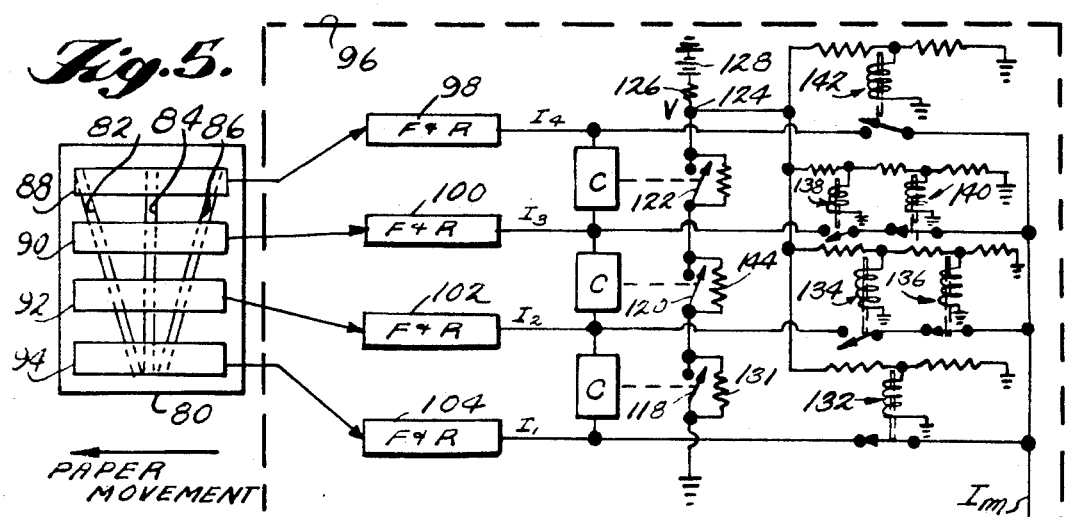
FIGURE 5 is a plan view of still another mask with a plurality of sensors connected to an amplitude detector circuit.

A still further mask and detector arrangement is shown in FIGURE 5. In this figure plate 80 is similar to plate 72 of FIGURE 4, and has corresponding diverging slots 82, 84 and 86 positioned like the slots in plate 72. Rather than a slidable overlying slotted plate, however, the present embodiment has mounted above plate 80 a plurality of stationary sensors or detectors 88, 90, 92 and 94, which as indicated diagrammatically in block form may be of the solid state type or any other conventional type, with or without collimators or the like. In the system shown in FIGURE 5, these detectors have their respective outputs connected to amplitude detector 96, which selects only the detector output that is maximum and utilizes this one ouput to energize the respective one of filters 98, 100, 102, 104. Amplitude detector 96 is further discussed following a consideration of FIGURES 6 and 7.

Figure 6:
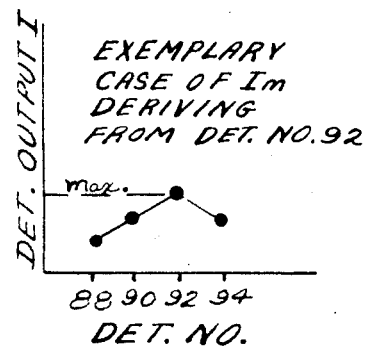
FIGURE 6 is a plot of the current response from the detectors in FIGURE 5.

Since the range of wire mark spacing is generally small compared to the wire mark spacing, a typical plot of detector current output I from the four FIGURE 5 sensors or detectors 88–94 may be as indicated in FIGURE 6. From this plot it is apparent that current I is a discrete decreasing function about some peak and the peak in this example is shown to be from detector number 92. It is, of course, possible that the peak value may be shared by two adjacent detectors and that the system could utilize more or less than the four detectors shown in FIGURE 5.

Figure 7:
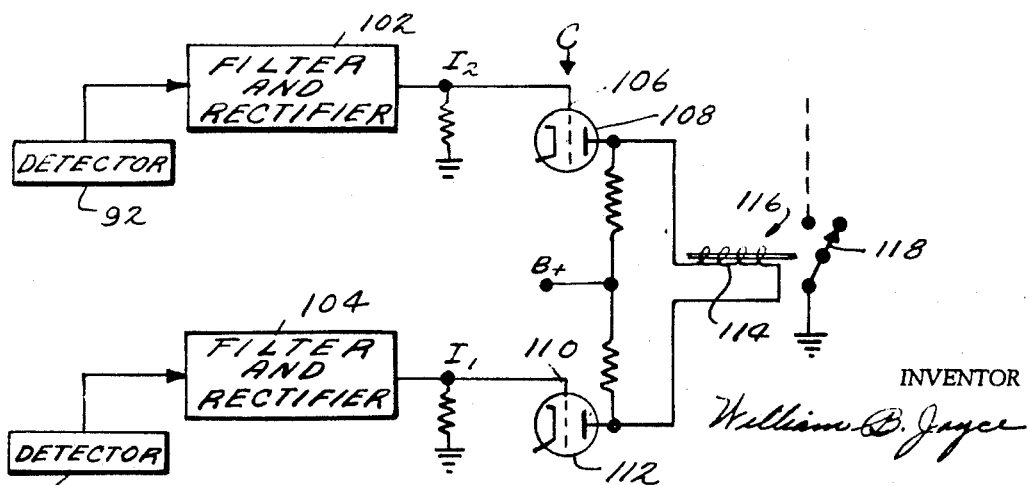
FIGURE 7 is a typical comparator circuit useful in the circuitry of FIGURE 5.

FIGURE 7 discloses a type of comparator circuit C useable in the amplitude detector 96 of FIGURE 5. In this circuit, exemplary detectors 92 and 94 both sense the amount of transmitted light at their respective positions and produce a signal which is filtered and rectified in respective circuits 102 and 104 in a manner similar to that discussed in FIGURES 1a and 2. Current $I_2$ from filter-rectifier 102 is applied to grid 106 of a tube 108 and current $I_1$ from filter rectifier 104 is applied to grid 110 of the tube 112 for amplification. Coil 114 of relay 116 is differentially connected to the plate circuits of tubes 108 and 112. In order to assure proper sequential operation, relay 116 is of the directional type and closes its contact 118 only if $I_2$ is greater than $I_1$.

Figure 8:
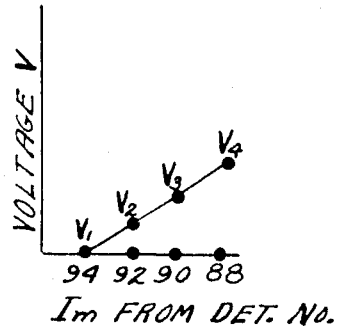
FIGURE 8 is a plot of voltage at terminal 124 in FIGURE 5.

Referring back now to FIGURE 5, if $I_1$ is the maximum output then comparator controlled relay contacts 118, 120, 122 are all closed. These contacts are connected in series from ground to point 124 which in turn connects through resistor 126 to a voltage source such as battery 128. With the contacts all closed, the voltage V at point 124 is zero. Thus, only $I_1$ is connected to the $I_m$ output line 130 which in the systems of FIGURES 1a and 2 connects to the same circuitry as detector 26. If $I_1 < I_2 > I_3 > I_4$, then only relay contacts 120 and 122 close. Since open contact 118 is bypassed by resistor 130, voltage V at point 124 then equals a finite voltage $V_2$ (see FIGURE 8). The resistances and relay coil impedances are so balanced for relays 132, 134, 136, 140, 142 that they operate as follows. When the voltage at point 124 is $V_2$, the normally closed contact of relay 132 opens, and the normally open contact of relay 134 closes. Therefore, current $I_2$ is connected to the $I_m$ terminal through the normally closed contact of relay 136. In a like manner if $I_1 < I_2 < I_3 > I_4$, then $I_3$ is the maximum current and comparator relay contact 120 will open and contact 118 stays open. With an extra resistor 144 in series, V now assumes the voltage lead of $V_3$, contact of relay 132 stays open and of relay 134 stays closed, while the contact of relay 136 closes, so current $I_3$ alone is connected to the $I_m$ terminal. Similarly, when $I_4$ is maximum, the contact of relay 142 closes and the other relays operate so that only the $I_4$ current is connected to the $I_m$ output line 130. Thus, in general, the $I_m$ terminal is the output of the detector which is in the optimum detecting position and the voltage at junction 124 tells which detector it is.

It should be noted that the contacts of relays 132 and 134 may move at the same time, so that they could be ganged. Alternately, the contact of relay 134 closes just before that of relay 132 opens to avoid momentary zero voltage at the $I_m$ terminal.

Amplitude detector 96 of FIGURE 5 represents only one way by which the detectors with the maximized output can be selected, and and many other circuit arrangements could be suitably used. For example, interpolation schemes are possible, the difference between $I_m$ and its neaarest neighbor (one or possibly two) being used as a weighing factor in averaging $I_m$ with the next largest value of I which will be one of the two adjacent detector outputs. Also, the difference between the two neighbors may be used as a weighing factor.

It is pointed out that the width of the slots (with the exception of the single slot plate in FIGURE 4) should be approximately half the wire mark size when slot spacing $t'$ equals wire mark separation $t$. The more slots of course, the greater the sensitivity. The wire mark and formation intensity detection in conjunction with the adjustable masks described above, will proceed in a manner similar to that of the wire mark intensity gauge.

When the slots are separated by a wire mark distance, this gauge detects maximum. The same maximum is detected at n times the wire mark separation hence the gauge does not distinguish. This is a desirable function, however, since on the one hand it means that slots need not be necessarily separated by the wire mark but may be twice or three times the wire mark, etc. whichever is mechanically convenient. On the other hand, the wire mark size is fairly accurately known for a given machine and the range of the wire mark sizes over which this detector will operate (e.g. related to the choice of a in FIGURE 4) may be quite small and thus only one maximum will fall into the range of the detector.

By using a wire mark detector, the paper speed may also be determined. Paper speed, or parameters which may be determined from or by using paper speed, may be of interest in controlling or evaluating the paper machine or for evaluating some properties of the paper produced.

The output of wire mark detector 26 is a time dependent quantity which is a unique increasing function of transmitted light (preferably, the output is linear with transmitted intensity). A Fourier transform of this time dependent quantity into its frequency components selects a sharp and high peak at the value of frequency given by $Wm = s/t$ where $t$ as before is the wire mark wave length (separation, or length of unit cell, or thickness of one dark plus one light line in the wire mark) and $s =$ speed of the paper. The wire mark size $t$ is nearly constant for each paper machine and thus $Wm$ is directly proportional to $s$. Thus, a device to detect $Wm$ may be calibrated directly in speed units. The output 49 from filter 28' in FIGURE 2 may then be an output in speed units, recalling that the wire mark frequency $Wm$ is directly proportional to the speed of the paper.

The wire mark size is approximately equal to the size of the wire which produces the mark, but is somewhat different due to distortion from pressing, stretching, heating, etc., which the paper undergoes. Thus, the output calibrations may be calculated directly from the screen size, but a better approximation would probably result from an empirical calibration at the point when the speed detector is installed. This can be done either by comparison with another speed detector or by measuring the wire mark at this point. Because $Wm$ is linear in speed, only a single point is needed for calibration.

If the wire detector also detects wire mark spacing such as indicated in the output signal of size detector 42, then an output may be taken from detector 42 in conjunction with a signal from filter 28' indicating frequency, to a computation circuit 44 which calculates the product $Wmt$ to give a final speed reading at meter 46. In this way, the speed of any moving object can be measured, as long as it has a regularly repeated detectable mark.

This device may also be used as a production length gauge for paper. If the detector signal is amplified and filtered to permit passing only of signals of the approximate frequency defined by $s/t$ where $s$ and $t$ are as previously defined, then the effect of the wire mark on the sheet is attained by as simple oscillatory signal as described in the wire mark intensity gauge circuit. For the purposes of a footage counter, each positive swing of this signal may be used to trigger a pulse network and the resultant square wave pulses counted in a conventional signaling circuit. In this way, the total length of the sheet produced in a given time $\theta$ is determined as $Nt$ where N is the number of pulses counted in this interval $\theta$. It should be noted that wire mark spacing $t$ as it appears on the sheet may be slightly different from the actual spacing $t''$ of the wire itself. Spacing $t$ will be similar to $t''$ but may be different due to stretch or shrinkage of the sheet during the process. Such stretch or shrinkage may be corrected automatically by the use of a draw speed indicator signal which will provide the correction, giving the ratio of the sheet speed at the detector to the sheet speed at the wire, which will be proportional to $t/t''$.

As an alternative to the measurement of each pulse created by the wire mark, it would be satisfactory merely to determine the average frequency of such wire marks and hence determine the length L produced in the time $\theta$ by electrically performing the integral $$L = \int_0^\theta Wmt \, d\theta$$

The advantage of this embodiment is that it can provide a record of linear footage produced from a measurement without contact with the sheet. Since the measurement is dependent on regular marks imposed on the sheet in the manufacturing process, the measurement cannot be in error due to slippage, such as is the case with conventional contact wheels. In addition, a contact wheel bearing on the sheet when it is passing over a roller may also measure when the sheet is not present, unless it is automatically lifted from the roll as soon as there is no paper between the roll and the contact wheel. Furthermore, the wear properties on a contacting wheel will generally develop significant errors.

The last two paragraphs have discussed measuring sheet length by integrating sheet speed using the wire mark detector which does not detect changes in wire mark spacing. It is more accurate, however, to integrate the speed measurement of FIGURE 2 (output 46), which already contains the correction for changes in wire mark spacing. This provides the same correction as does the combination of a draw speed indicator and measurement of the actual wire spacing $t''$.

It is to be noted that this invention could use a watermark on the sheet rather than a wire mark as the sheet marker. The same means would be used for detecting the watermark as for the wire mark and generally the same electronic circuitry for processing the detector outputs. The spacing of the watermarks would, of course, be very much larger and would lead to a much smaller frequency output.

Various types and combinations of different filters may be used in the different embodiments of this invention described herein. For consideration of filters and their frequency ranges, reference is made to the typical spectral analysis shown in FIGURE 9. As indicated previously relative to FIGURE 1a, the frequencies resulting from the use of a mask in accordance with this invention, are relatively low frequencies when detection is of the formation characteristics of the paper being inspected. Therefore, low pass filter 32 of FIGURE 1a passes frequencies from about $f_B$ to zero frequency to measure a total formation, or down to frequency $f_A$ for inspecting formation in a narrower frequency range. The latter type of filter may either have a broad, medium or narrow band range, according to the frequency band of the formation which is being inspected.

In FIGURE 1a, filter 28 may be a high pass filter as indicated, which will pass all of the frequencies from $f_C$ to infinity, since in many cases it may be just the wire mark that will provide the only significant contribution to the output signal above frequency $f_C$. On the other hand, filter 28 may be of the band pass type, for example, a narrow band filter, which covers the frequency range $f_C$ to $f_D$ in FIGURE 9, thereby rejecting any noise signal above frequency $f_D$. Pass range $f_C$ to $f_D$ is just wide enough to include the variations in the peak frequency $Wm$, which occur because of the speed changes or changes in the wire mark spacing $t$ in any given application.

Figure 9:
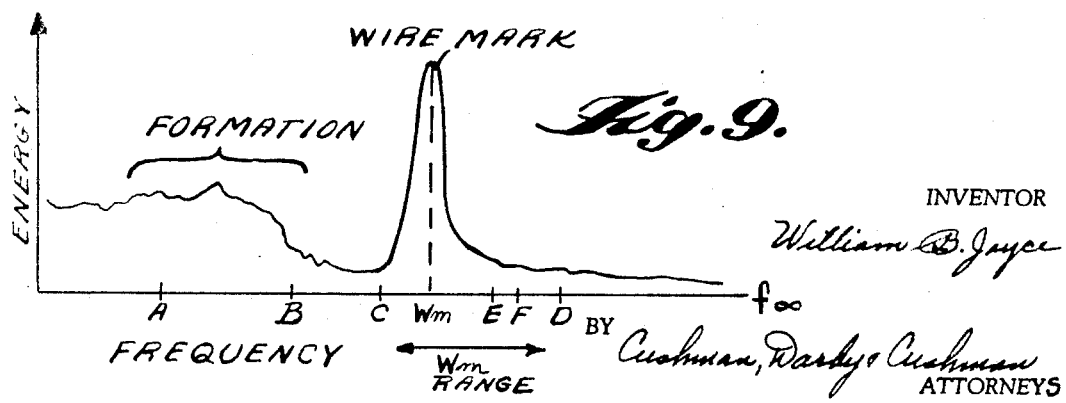
FIGURE 9 is a graph showing a typical spectral analysis for paper using a mask of this invention.

The above mentioned filters are all of the fixed frequency type, and they may be used in the various embodiments of this invention described relative to FIGURE 2, but preferably a variable frequency filter is used therein, a filter which has a very narrow pass range $f_E$ to $f_F$ as shown in FIGURE 9. This narrow pass range is variable, as indicated in FIGURE 9 by the $Wm$ range, in order to locate the position of the peak wire mark frequency $Wm$.

As a further indication of various embodiments of this invention, reference is made to the following chart indicating various types and combinations of filters that may be employed.

| Provides information sufficient to determine— | Embodiment No.[1] | | | |
|---|---|---|---|---|
| | 1 | 2 | 3 | 4 |
| Wire mark intensity, uncorrected | X | X | X | X |
| Wire mark spacing | | | X | X |
| Paper speed uncorrected and lineal footage uncorrected | X | X | X | X |
| Paper speed and lineal footage corrected for variation in wire mark spacing | | | X | X |
| Wire mark intensity corrected for changes in wire mark spacing | | | X | X |

[1] X means "yes."

In the above chart, embodiment No. 1 refers to an arrangement using a rigid mask (unadjustable) with a high pass filter covering the range $f_C$ to infinity.

Embodiment No. 2 refers to the same type of mask as No. 1, but with a band pass filter having a range $f_C$ to $f_D$ so as to reject some noise.

In either the No. 1 or No. 2 embodiment, frequency may be measured by adding thereto one or two of the previously described very narrow pass, variable frequency, filters, or by digitally counting the frequency.

Embodiment No. 3 in the above chart refers to an arrangement with a variable spacing mask which has its spacing automatically optimized, as determined by, for example, one or two of the aforesaid variable frequency, very narrow pass filters, but with the amplitude signal taken either from one of the outputs of those narrow pass filters, or from the average of the outputs of the narrow pass filters. Alternatively, the amplitude signal may be taken from an additional fixed frequency filter, which either has a band pass range $f_C$ to $f_D$, or passes all frequencies above $f_C$. The frequency signal may be taken from either the variable narrow pass filter, or digitally.

Embodiment No. 4 in the above chart refers to an arrangement having a variable spacing mask with the spacing being optimized by signal maximization, combined with a fixed frequency filter having a frequency range $f_C$ to $f_C$ or $f_C$ to infinity and yielding only the amplitude output. In this case, with no variable frequency filters, the frequency may be measured by a frequency measuring circuit as desired.

Embodiments No. 3 and 4 provide more information, but are considerably more costly, than embodiments Nos. 1 and 2. Embodiment No. 1 provides for good performance at considerable inexpense, while embodiment No. 2 improves the performance somewhat, but adds to the cost.

In all of the charted embodiments, Nos. 1–4, either the low pass or band pass formation filter described above, may be added, as desired. These filters, or any others, can be automatically shifted, or manually shifted, in frequency range to correspond in changes in machine speed.

Thus, it is apparent that this invention has provided for all of the objects and advantages herein stated. Still other objects and advantages of this invention, and even further embodiments and modifications of this invention, will become apparent to those of ordinary skill in the art upon reading this disclosure. It is to be understood, however, that this disclosure is intended to be exemplary and not limitative, the invention being defined by the appended claims.

What is claimed is:

1. In apparatus for obtaining useful information concerning a moving web having a given pattern by detecting that given pattern in the web by the use of an energy beam directed onto the web and detecting the resulting energy given off by said web as it continuously moves in the same direction relative to the beam, the improvement comprising:

mask means disposed in said beam and having a plurality of apertures corresponding at least partially to said given pattern, and
   means including detecting means associated with said mask means for indicating the quality of the web in accordance with the detected intensity of said given pattern.

2. The improvement in claim 1 including means responsive to the output of said detecting means for indicating web formation.

3. The improvement in claim 1 wherein the said mask apertures are at least partially spaced approximately as part of said pattern.

4. The method of sensing intensity of recurring wire marks in the structure of paper as it continuously moves forward, comprising the steps of:

transmitting radiation energy from said material and through a mask having an aperture pattern corresponding at least partially to said marks to produce an energy signal varying in amplitude in accordance with the intensity and varying in frequency in accordance with the recurrence of said marks, detecting said varying energy signal to produce a corresponding detector output signal, filtering said output signal to attenuate unwanted frequency components, and measuring the amplitude of said filtered output signal to obtain an indication of the intensity of said recurring wire marks.

5. In equipment for continuously moving a web in the same direction, the improvement of apparatus for detecting a given pattern in said web comprising:

source means for directing radiation onto said web as it moves continuously, detector means for detecting variations in the said radiation as it is given off by said web, apertured mask means disposed in the path of said radiation and having a plurality of apertures for enhancing detection by said detector means, filter means for passing a range of frequencies of the output signal from said detector means above a given frequency, means responsive to said passed frequencies of said output signal for indicating said pattern intensity.

6. In equipment for continuously moving a web in the same direction, the improvement of apparatus for detecting a given pattern in said web comprising:

source means for directing radiation onto said web as it moves continuously, detector means for detecting variations in the said radiation as it transmitted by said web, means, including mask means disposed in the path of said radiation and having a plurality of apertures corresponding at least partially to said given pattern, for causing the said detector means to be particularly sensitive to said given pattern, metering means, means for filtering the output signal of said detector means to cause said metering means to indicate the intensity of said pattern, second metering means, and second means for filtering the output signal of said detector means to cause said second metering means to indicate web formation.

7. In apparatus for obtaining useful information concerning a moving web having a given pattern by detecting that pattern in the web by the use of an energy beam directed onto the web and detecting the resulting energy given off by said web as it continuously moves in the same direction relative to the beam, the improvement comprising:

mask means disposed in said beam and having a plurality of apertures corresponding at least partially to said given pattern, detecting means associated with said mask means for receiving the energy passing through said apertures as said web moves, and means responsive to signals from said detecting means for automatically adjusting said mask means to conform said apartures closer to said web pattern.

8. The improvement in claim 7 wherein the space between said apertures is varied by said adjusting means.

9. In equipment for continuously moving in the same direction a web having a given repeating pattern, the improvement comprising:

source means for directing radiation onto said web as it moves continuously, detector means for detecting, because of said pattern, variations in the said radiation as it is given off by said web, and means including mask means disposed in the path of said radiation and having a plurality of apertures at least partially spaced approximately as parts of said given pattern for causing the said detector means to be particularly sensitive to said given pattern.

10. The improvement in claim 9 including:

an adjustable frequency filter for providing a signal indicative of the frequency of the output signal from said detector means, and means includng amplitude detection means responsive to the output of said filter for adjusting the frequency thereof toward the frequency of said detector output signal.

11. The improvement in claim 10 including:

means for determining the spacing between given elements in said pattern as said web moves continuously, and multiplication means responsive to said filter and determining means for effectively multiplying said spacing and detector output frequency to obtain a signal indicative of the speed of said web.

12. The improvement in claim 9 including means responsive to the output of said detector means for determining the size of said pattern.

13. The improvement in claim 9 including means responsive to the output of said detector means for determining the frequency of said pattern as said web moves.

14. The improvement in claim 9 including means responsive to the output of said detector means for determining the speed said web moves.

15. In equipment for continuously moving in the same direction as a web having a given repeating pattern, the improvement comprising:

source means for directing radiation onto said web as it moves, detector means for detecting variations in the said radiation as it is given off from said web, means including mask means disposed in the path of said radiation and having a plurality of apertures at least partially spaced approximately as parts of said given pattern for causing the said detector means to be particularly sensitive to said given pattern, and means to automatically adjust said mask means to improve detection of said pattern.

16. The improvement in claim 15 including an adjustable frequency filter between said detecting and adjusting means and adjusted by the latter to maximize a signal.

17. The improvement in claim 15 wherein the effective spacing between said mask apertures is adjustable and said adjusting means automatically adjusts said spacing to be similar to the spacing of pattern elements that are configured like said apertures.

18. The improvement in claim 17 wherein said mask means comprises:

at least two juxtaposed, relatively movable plates respectively having slots forming said apertures, and means for maintaining said slots parallel while their separation distance is adjusted by said adjusting means.

19. The improvement in claim 17 wherein said mask means comprises:

two superposed devices relatively movable in a first direction by said adjusting means, one of said devices being a plate having a slot extending in a second direction which is generally parallel to said first direction, the other of said devices having a plurality of diverging slots extending generally in said second direction and coinciding in part with said slot in said plate to form the said apertures.

20. Apparatus for obtaining information concerning a web which has a given repeating pattern, comprising:

means for continuously moving said web, source means for directing radiation onto said web as it moves, and means, including radiation detector means and apertured mask means between said source and detector means, for selecting the best match sensed by said detector means of the mask apertures and said web pattern.

21. In apparatus for continuously moving in the same direction a web having a given repeating pattern, the improvement comprising:
source means for directing radiation onto said web as it moves,
detector means for detecting variations in the said radiation as it is given off by said web,
plate means disposed between said source and detector means and having a plurality of juxtaposed slots spaced from each other different distances at different sets of corresponding points along their length, and
means cooperating with at least one of said plate and detector means for determining at which of said point sets the distance between said slots best matches the distance between given parts of said web pattern.

22. The improvement in claim 21 wherein said cooperating means includes:
a second plate having a slot extending transversely of the slots in said plate means, and
means responsive to the output of said detector means for relatively moving said second plate and plate means in superposed relationship so that the second plate slot embraces the set of said points affording the aforesaid best match.

23. The improvement in claim 21 wherein:
the said detector means includes a plurality of radiation detectors disposed across said slots at said point sets respectively, and
said cooperating means includes means responsive to the outputs of said detectors for selecting the detector output which is the largest and thereby represents the aforesaid best match.

24. In equipment for continuously moving in the same direction a web having a given pattern, the improvement comprising:
source means for directing radiation onto said web as it moves continuously,
detector means including a plurality of detectors for detecting variations in the said radiation as it is given off from said web, and
means, including mask means disposed in the path of said radiation and having an aperture pattern varyingly related at least partially to the said given pattern for optimizing the output from said detector means relative to said given pattern.

25. The improvement in claim 24 wherein:
said mask means has a plurality of juxtaposed slots spaced from each different distances at different points along their length,
said detectors being disposed across both slots at said different points, and
said optimizing means includes means responsive to said detectors for selecting the detector output which is the largest.

26. In equipment for continuously moving in the same direction a web having a given pattern, the improvement comprising:
source means for directing radiation onto said web as it moves continuously,
detector means for detecting variations in the said radiation as it is given off from said web,
means for detecting the amplitude of the detector means output,
apertured mask means disposed in the path of said radiation for enhancing detection of said given pattern, and
feedback circuit means responsive to the output of said amplitude detecting means for adjusting said mask means to optimum relative to said given pattern.

27. The improvement in claim 26 including variable frequency filter means controlled in frequency by the output of said amplitude detecting means for passing to the amplitude detecting means the maximum amplitude of the maximized output of said detector means.

28. In equipment for continuously moving in the same direction a web having a given repeating pattern of marks, the improvement in apparatus detecting said pattern in said web comprising:
source means for directing radiation onto said web as it moves,
detector means for detecting variations in the said radiation as it is given off by said web,
adjustable mask means disposed in the path of said radiation and having a plurality of apertures at least partially spaced approximately as said marks in said given pattern for causing said detector means to be particularly sensitive to said given pattern,
variable frequency band-pass filter means for filtering the output signal of said detector means,
means for automatically adjusting said variable frequency filter to maintain a maximum signal and
means for automatically adjusting the spacing of said apertures in said mask means towards equalization with the spacing between said pattern marks to improve detection of said pattern.

29. In equipment for continuously moving a web in the same direction, the improvement in apparatus detecting a given pattern in said web comprising:
source means for directing radiation onto said web,
detector means for detecting variations in the said radiation as it is transmitted by said web,
mask means disposed in the path of said radiation and having a plurality of apertures for causing the said detector means to be particularly sensitive to said given pattern,
means including a variable frequency filter for attenuating unwanted frequencies of the said detector signal,
means including a feedback circuit for maintaining the detector amplitude at a maximum value, and
means for indicating said maximized output of said variable frequency signal in such a manner that said maximized output will be an indication of the speed of said web.

30. In apparatus for detecting wire mark in paper continuously moving in the same direction, the improvement comprising:
light source means for directing light radiation onto said paper,
detector means for detecting the variations in the paper caused by the presence of said wire mark,
means disposed in the path of said radiation and having a plurality of apertures for causing said detector means to be particularly sensitive to said wire mark,
said apertures being maintained in the same relationship while being variable as to the distance between, and
means for varying the distance between the apertures to maximize the output signal of said detector means.

31. In an apparatus for detecting a wire mark in paper continuously moving in the same direction, the improvement comprising:
light source means for directing light radiation onto said paper,
mask means disposed in the path of said radiation and having a translucent pattern enhancing detection of said wire mark,
detector means for detecting the variations in the paper caused by the presence of the wire mark and including a plurality of light sensors spaced over said translucent pattern,
means for selecting the one output signal from the one sensor which is a maximum value, and
means for indicating a parameter of the paper by metering said output signal.

32. Apparatus for sensing intensity of recurring wire marks in the structure of paper as it continuously moves forward, comprising:
- a mask having an aperture pattern corresponding at least partially to said marks,
- means for transmitting radiation energy from said material and through said mask to produce an energy signal varying in amplitude in accordance with the intensity and varying in frequency in accordance with the recurrence of said marks,
- means for detecting said varying energy signal to produce a corresponding detector output signal,
- means for filtering said output signal to attenuate unwanted frequency components, and
- means for measuring the amplitude of said filtered output signal to obtain an indication of the intensity of said recurring wire marks.

References Cited

UNITED STATES PATENTS

| | | |
|---|---|---|
| 2,246,001 | 6/1941 | Powers. |
| 2,817,266 | 12/1957 | Gelardin. |
| 2,844,068 | 6/1958 | Williams. |
| 3,114,791 | 12/1963 | Zabel et al. |
| 3,169,193 | 2/1965 | Strang. |
| 3,193,688 | 7/1965 | Morton et al. |
| 3,218,911 | 11/1965 | Bower et al. _____ 250—237 X |

RALPH G. NILSON, *Primary Examiner.*

M. A. LEAVITT, *Assistant Examiner.*

U.S. Cl. X.R.

88—14; 162—263; 250—201, 214, 237

UNITED STATES PATENT OFFICE
CERTIFICATE OF CORRECTION

Patent No. 3,437,823              Dated April 8, 1969

Inventor(s) William B. Joyce

It is certified that error appears in the above-identified patent and that said Letters Patent are hereby corrected as shown below:

Column 4, line 2, "radiants" should read ---radians---; line 7, "the" should read ---The---.

Column 7, line 17, after "136" insert ---138,---.

Column 10, line 26, "$f_c$", second occurrence, should read ---$f_D$---.

Claim 15, column 12, line 29, delete ---as---.

Signed and sealed this 8th day of February 1972.

(SEAL)
Attest:

EDWARD M. FLETCHER, JR.
Attesting Officer

ROBERT GOTTSCHALK
Commissioner of Patents